March 18, 1952 R. V. POUND 2,589,861
MICROWAVE FREQUENCY MODULATED TRANSMITTER
Filed April 30, 1946
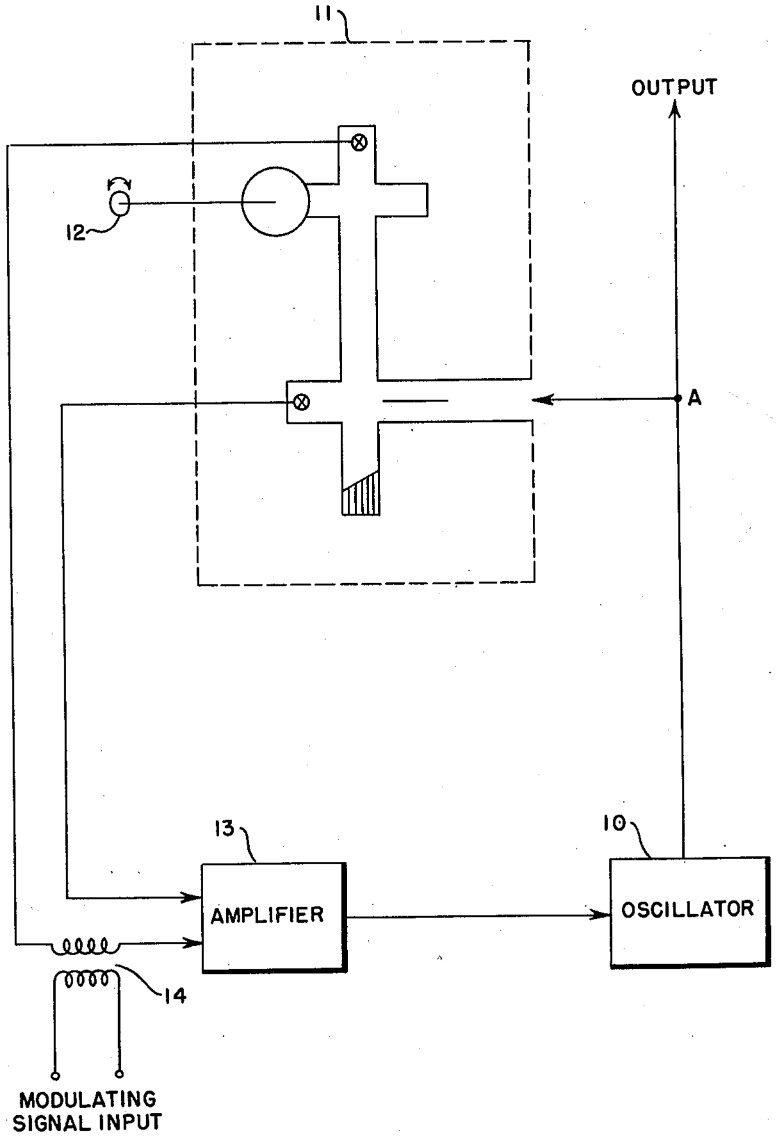
INVENTOR
ROBERT V. POUND
BY
William D. Hall
ATTORNEY Patented Mar. 18, 1952 2,589,861

UNITED STATES PATENT OFFICE 2,589,861

MICROWAVE FREQUENCY MODULATED TRANSMITTER

Robert V. Pound, Cambridge, Mass., assignor, by mesne assignments, to the United States of America as represented by the Secretary of War Application April 30, 1946, Serial No. 665,995

14 Claims. (Cl. 332—19)

This invention relates in general to communication systems and more particularly to communication systems involving automatic frequency control or stabilization.

In the most common frequency modulated communication systems, the modulated oscillator used has a relatively low frequency and low power output, and the high carrier frequency and high power output required for transmission are obtained by a series of frequency multipliers and power amplifiers. The oscillator is frequency modulated by a modulating signal applied through a reactance tube. Frequency stabilization is obtained by use of a crystal oscillator monitor whose output is combined with the modulated oscillator output in such a manner that the resultant signal, when passed through a conventional discriminator to the reactance tube, controls the modulated oscillator to compensate for frequency drift.

Such a system is disadvantageous in that a comparatively low radio frequency, low power oscillator must be used to enable modulation through a reactance tube. Further, while such a frequency stabilization system reacts relatively slowly in order to permit frequency deviations due to modulation, the system is ineffective to provide control of relatively rapid departures of the carrier frequency from its normal value. It is also inconvenient to use the many stages of frequency multipliers and amplifiers required when the desired transmitting frequency is in the microwave range.

It is an object of this invention to provide a frequency-stabilized microwave oscillator.

Another object of the present invention is to provide means by which frequency stabilization of a microwave oscillator may be obtained at any predetermined frequency within a wide frequency range.

It is a further object of the present invention to provide a frequency modulation system in which stabilization is effective throughout the modulation frequency period.

It is another and further object of the present invention to provide a frequency modulation system in which the frequency deviation from the normal or stabilized value is independent of the frequency response characteristics of the amplifier circuits between the point of insertion of the modulation signal and the oscillator.

It is another and still further object of the present invention to provide a stabilized frequency modulation system having substantially linear modulation.

For a better understanding of the invention, together with other and further objects thereof, reference is had to the following description, taken in connection with the accompanying drawing in which the single figure shown is a block diagram embodying the disclosed invention.

With reference to the drawing, there is shown a microwave oscillator 10 whose frequency is controlled as will appear. A portion of the signal output of oscillator 10 is extracted at a point A and fed into the input branch of a frequency discriminator 11. Frequency discriminator 11 employs magic-T construction, such as is disclosed in the copending application of Robert V. Pound, Serial No. 591,584, entitled Communication Systems, and filed May 2, 1945. As disclosed in the cited copending application, a resonant chamber terminating one branch of the magic-T structure is made tunable by a single adjustment means 12. The discriminator output consists of the difference between the outputs from crystals disposed in other branches of the magic-T structure is passed through an amplifier 13 to a control element of oscillator 10 to complete what is essentially a negative feed back loop. A transformer 14, having its secondary serially connected between discriminator 11 and amplifier 13, provides a means for causing frequency modulation of oscillator 10. Since both a modulating signal and a D.-C. control signal are impressed at the input to amplifier 13, the amplifier is designed to pass all frequencies ranging from D.-C. to well into the audio range. The manner in which amplifier 13 controls the output of oscillator 10 depends upon the particular type of oscillator to be used, and upon the range over which frequency control is desired. If, for example, an oscillator of the reflex klystron type is used, it may be tuned over a relatively narrow band of frequencies by applying the output of amplifier 13 directly to the reflector electrode. On the other hand, if a wider range of frequency control is desired, the output of amplifier 13 may be applied to a thermal element or other tuning means by which the oscillator grid spacing may be varied.

In operation, discriminator 11 produces an output error voltage indicative of the frequency difference between oscillator 10 and the resonant frequency of the cavity associated with discriminator 11. The resonant frequency of the cavity is selected by adjustment means 12. The magnitude of the error voltage signal is increased in amplifier 13 and the output thereof is imposed, for example, on the reflector control element of oscillator 10.

As an example of operation of the system, if it is assumed that the oscillator tube changes frequency by an amount $dv$, a change in the voltage output of amplifier 13 by an amount $-b\mu dv$ would result, where $b$ is the rate of change in the voltage output of the discriminator in volts per cycle, and $\mu$ is the voltage gain of amplifier 13 measured from the input grids to the reflector electrode of oscillator 10. Since the output of amplifier 13 is applied to the oscillator reflector electrode, the change in frequency cannot then be $dv$. A change $dv_1$ in oscillator output frequency results, which changes the reflector voltage to secure stabilization or reduce the unstabilized change $dv$. The corrective change due to amplifier 13 is $-be\mu dv_1$, where $e$ is the sensitivity of the reflector electrode in cycles per volt. Thus the resultant frequency change $dv_1$ is given by $$dv_1=dv-be\mu dv_1$$

or in another form, $$\frac{dv_1}{dv}=\frac{1}{1+be\mu}$$

the quantity $$\frac{dv_1}{dv}$$

is the stabilization factor of the system, since it gives the factor by which variations in frequency will be reduced.

Frequency modulation about the desired stabilized frequency is achieved by applying a modulating voltage to the input of amplifier 13. A change of modulating voltage is passed through amplifier 13 and changes the control voltage on the reflector electrode of oscillator 10. This, in turn, tends to change the oscillator frequency which, in turn, tends to change the difference in rectified voltage applied to the grids of the amplifier. This last change is in a direction to buck the added modulating voltage put in, and this process tends to return the net input to amplifier 13 to the value it had before the voltage was added. In brief, a high negative feed-back circuit is thus developed, affording stability to the frequency deviations. Quantitatively, an input voltage $dV$ will be bucked by a voltage $bdv$ where $dv$ is the frequency change in the oscillator output. The total resultant input voltage is then $dV-dbv$. The resultant frequency change equals this resultant voltage times the gain $\mu$ of the amplifier times the sensitivity $e$ of the oscillator 10 reflector electrode in cycles per volt or $$(dV-bdv)\mu e=dv$$

Solving for $dv$, we get $$dv=\frac{dV}{b}\left(1-\frac{1}{1+\mu eb}\right)$$

Thus is achieved a modulation which is applied with very great negative feedback. Therefore, the fidelity and frequency excursion is determined almost completely by the quantity $b$. If an alternating voltage is applied, it will produce frequency deviations of constant magnitude independent of the frequency of the alternating voltage up to frequencies at which the quantity $\mu eb$ becomes comparable with unity in absolute value.

While the invention herein disclosed relates to stabilization of oscillators operating in the microwave frequency range, it will be obvious to those skilled in the art that it is equally adaptable to oscillators operating at lower frequencies and that various changes and modifications may be made therein without departing from the scope of the invention as set forth in the appended claims.

What is claimed is:

1. In a communication system, the combination including a microwave oscillator having a frequency-determining element, frequency-stabilizing means comprising a discriminator having a plurality of wave guide branches coupled to the output of said microwave oscillator, said discriminator including a tunable cavity resonator coupled to one of said waveguide branches and rectifying crystal diodes spacially arranged in said branches and responsive to variations in the average voltage levels in said branches for producing an output voltage indicative of a frequency difference between the output frequency of said microwave oscillator and the resonant frequency of said tunable cavity resonator, an amplifier means interconnecting said crystal diodes and said frequency-determining element for amplifying modulation signals ranging in frequency from zero through the audio range and for impressing said signals on said frequency-determining element, and means for applying modulation signals to said amplifier means.

2. In a communication system, the combination including a microwave oscillator having a frequency-determining element, frequency-stabilizing means comprising a discriminator including a resonant cavity system having a plurality of branches, a diode crystal rectifying circuit differentially responsive to the average energy levels in separate branches of said cavity resonator system for producing a voltage responsive to deviations between the frequency of said oscillator and a resonant frequency of said cavity resonator system, amplifier means interconnecting said crystal rectifier circuit and said frequency-determining element for amplifying modulation signals ranging in frequency from zero through the audio range, and means for applying modulation signals to said amplifier means.

3. A transmitter comprising an oscillator having a frequency controlling element, a discriminator, said discriminator including a pair of rectangular waveguide T-bridges, each of said bridges comprising first and second waveguide arms perpendicular to each other and third and fourth co-linear waveguide arms perpendicular to said first and second waveguide arms; one of said T-bridges having a first arm coupled to the output of said oscillator, a crystal rectifier in its second arm, a reflectionless terminating impedance in its third arm, and its fourth arm coupled to the first arm of the other T-bridge; a crystal rectifier in the second arm of said other T-bridge and a tunable cavity resonator coupled to the third arm of said other T-bridge, and means for combining the outputs of said crystal rectifiers and impressing the combined outputs thereof degeneratively on the frequency controlling element of said oscillator, to thereby stabilize the frequency of the oscillator.

4. The transmitter defined in claim 3 wherein said last-named means includes a direct current amplifier having its input connected to said crystal rectifiers and its output connected to frequency controlling element of said oscillator.

5. The transmitter defined in claim 4 including means for frequency modulating said oscillator comprising a source of modulating potentials connected to the input of said amplifier.

6. A transmitter comprising an oscillator having a frequency controlling element, a discriminator, said discriminator including a pair of rectangular waveguide T-bridges, each of said bridges comprising first and second asymmetrical waveguide arms and third and fourth symmetrical waveguide arms intersecting at a common junction, the first arm of one of said T-bridges being coupled to the output of said oscillator, a crystal rectifier in the second arm of said one T-bridge, a terminating impedance in the third arm of said one T-bridge, the fourth arm of said one T-bridge being coupled to the first arm of the other T-bridge, a crystal rectifier in the second arm of said other T-bridge, and means for combining the outputs of said crystal rectifiers and impressing the combined outputs thereof degeneratively on the frequency controlling element of said oscillator.

7. The transmitter defined in claim 6 wherein said last-named means includes a direct current amplifier having its input connected to said crystal rectifiers and its output connected to frequency controlling element of said oscillator.

8. The transmitter defined in claim 7 including means for frequency modulating said oscillator comprising a source of modulating potentials connected to the input of said amplifier.

9. The combination of an oscillator having a frequency controlling element, a discriminator, said discriminator including a pair of waveguide T-bridges, each of said bridges comprising first and second waveguide arms perpendicular to each other and third and fourth co-linear waveguide arms perpendicular to said first and second waveguide arms, one of said T-bridges having a first arm of one of said T-bridges coupled to the output of said oscillator, a rectifier in its second arm, a terminating impedance in its third arm, the first arm of the other T-bridge being coupled to the output of said oscillator, and a rectifier in the second arm of said other T-bridge, and means for combining the outputs of said rectifiers and impressing the combined outputs thereof degeneratively on the frequency controlling element of said oscillator.

10. The combination defined in claim 9 including means for tuning said oscillator comprising a tunable cavity resonator coupled to the third arm of said other waveguide T-bridge.

11. The combination of an oscillator having a frequency controlling element, a discriminator, said discriminator including a rectangular waveguide T-bridge comprising first and second waveguide arms perpendicular to each other and third and fourth co-linear waveguide arms perpendicular to said first and second waveguide arms, the first arm of said T-bridges being coupled to the output of said oscillator, a rectifier in the second arm of said T-bridge, and means for impressing the output of said rectifier degeneratively on the frequency controlling element of said oscillator.

12. The combination defined in claim 11 including a tunable cavity resonator coupled to the third arm of said T-bridge.

13. The combination defined by claim 12 including means for frequency modulating said oscillator comprising a source of modulating voltage connected in series between said rectifier and said frequency controlling element.

14. In combination, an oscillator having a frequency controlling element, a discriminator, said discriminator including a rectangular waveguide T-bridge comprising first and second waveguide arms perpendicular to each other and third and fourth co-linear waveguide arms perpendicular to said first and second waveguide arms, the first arm of one of said T-bridges being coupled to the output of said oscillator, a terminating impedance in the third arm of said T-bridge, a rectifier in the second arm of said T-bridge, and means for impressing the output of said rectifier degeneratively on the frequency controlling element of said oscillator.

ROBERT V. POUND.

REFERENCES CITED

The following references are of record in the file of this patent:

UNITED STATES PATENTS

| Number | Name | Date |
|---|---|---|
| 2,243,216 | Lindenblad | May 27, 1941 |
| 2,402,421 | Lindenblad | June 18, 1946 |
| 2,414,100 | Hansen et al. | Jan. 14, 1947 |
| 2,479,697 | Norton | Aug. 23, 1949 |
| 2,486,001 | Bruck et al. | Oct. 25, 1949 |